June 12, 1962  T. E. DAVIS  3,038,369
POSITIONING A TRANSISTOR BY USE OF THE OPTICAL
REFLECTANCE CHARACTERISTICS OF
THE ELECTRODE STRIPES
Filed Dec. 22, 1958  4 Sheets-Sheet 2
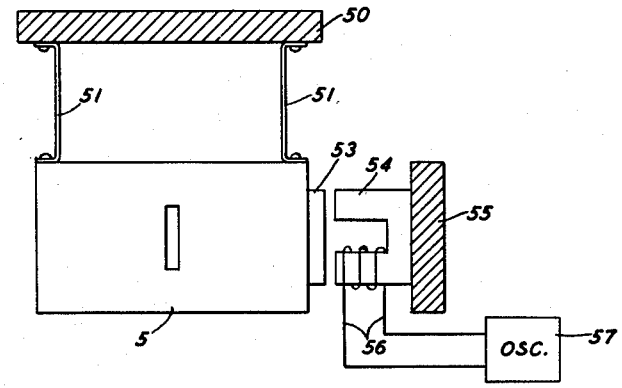
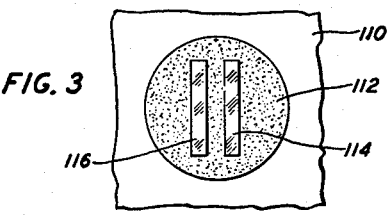
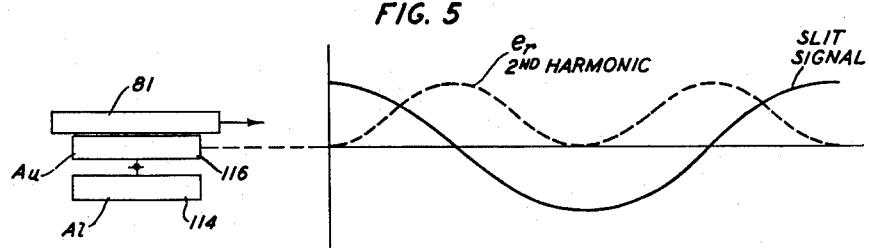
INVENTOR
T. E. DAVIS
BY
ATTORNEY June 12, 1962 T. E. DAVIS 3,038,369
POSITIONING A TRANSISTOR BY USE OF THE OPTICAL
REFLECTANCE CHARACTERISTICS OF
THE ELECTRODE STRIPES
Filed Dec. 22, 1958 4 Sheets-Sheet 3
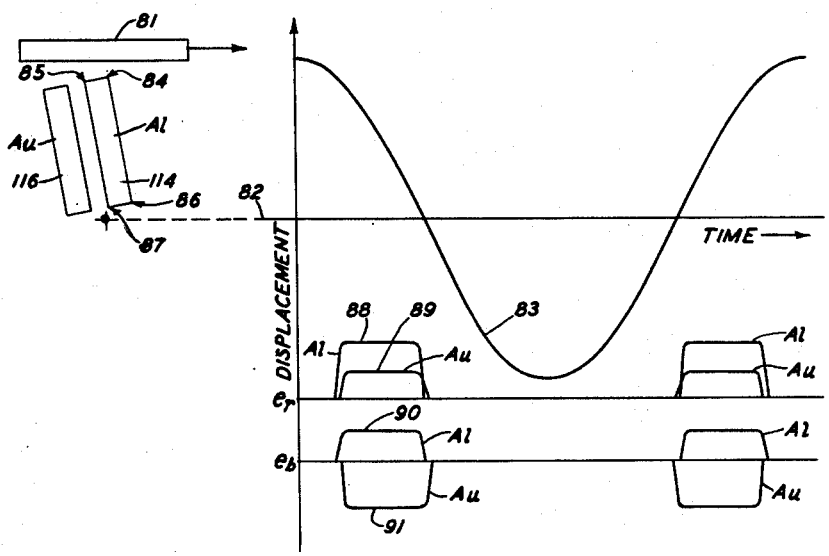
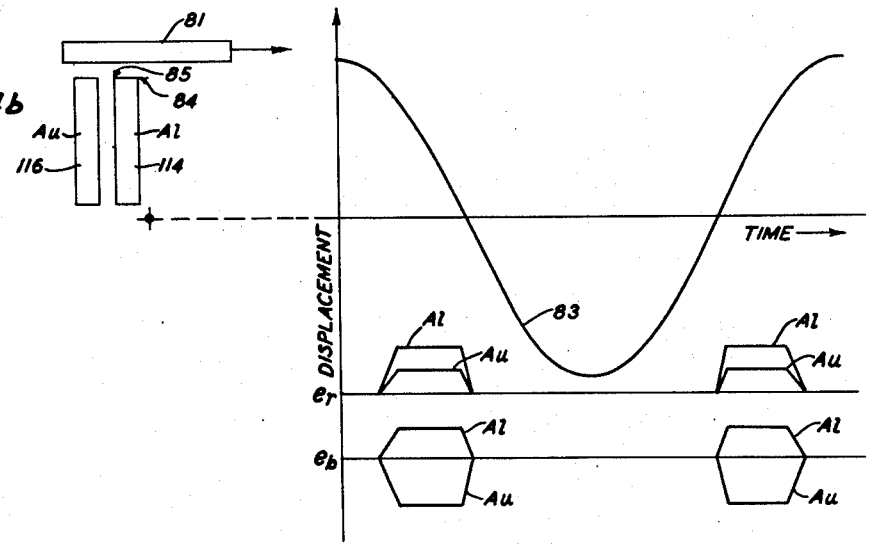
INVENTOR
T. E. DAVIS
BY
ATTORNEY

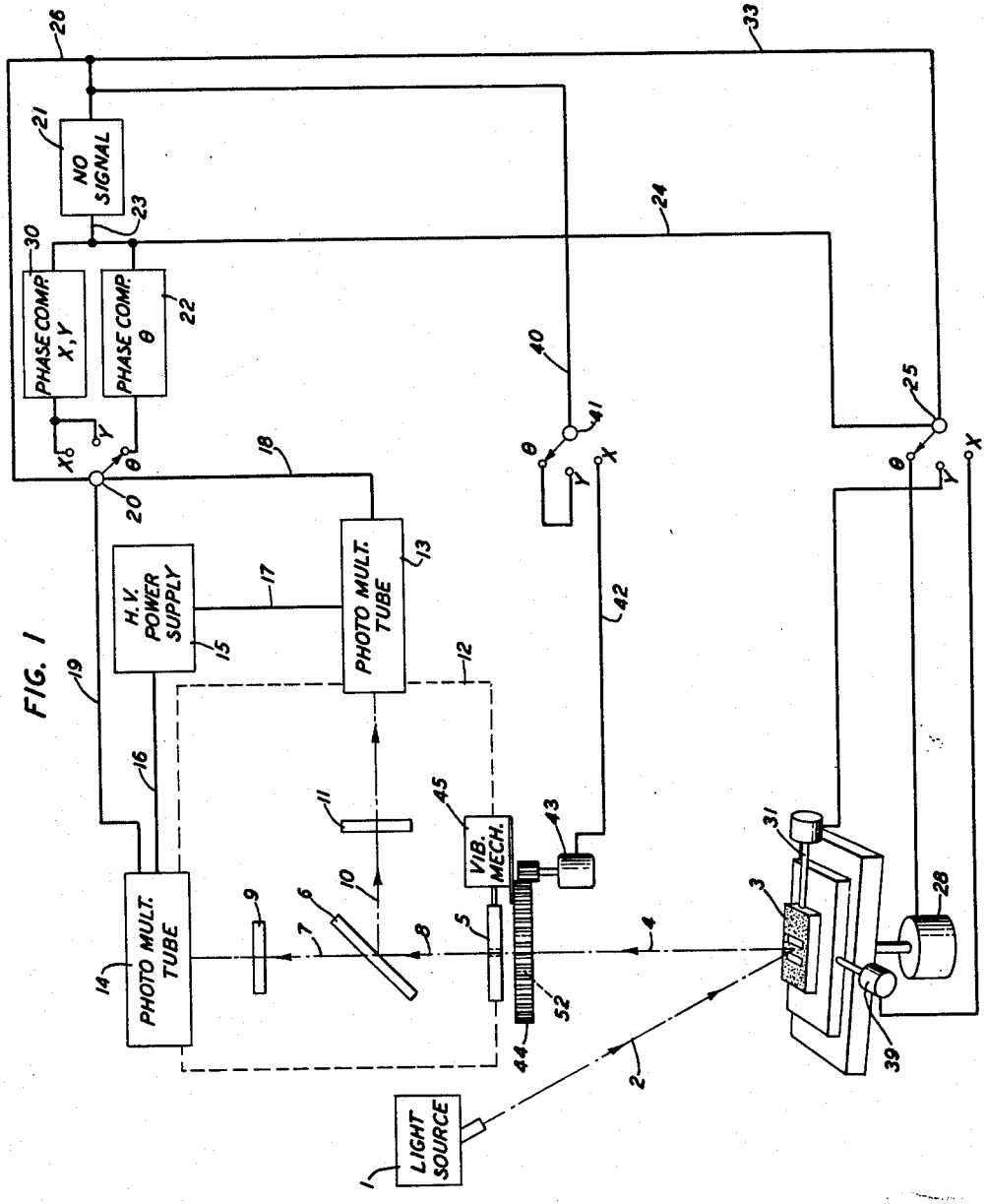

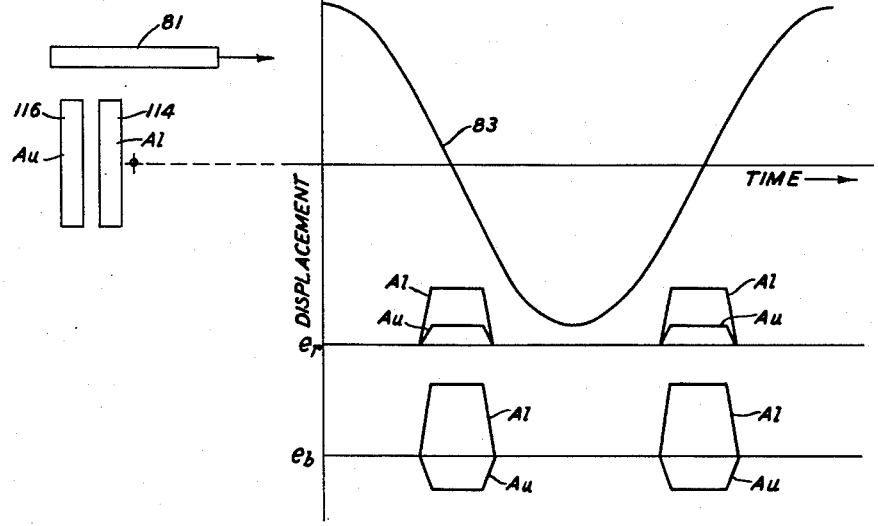
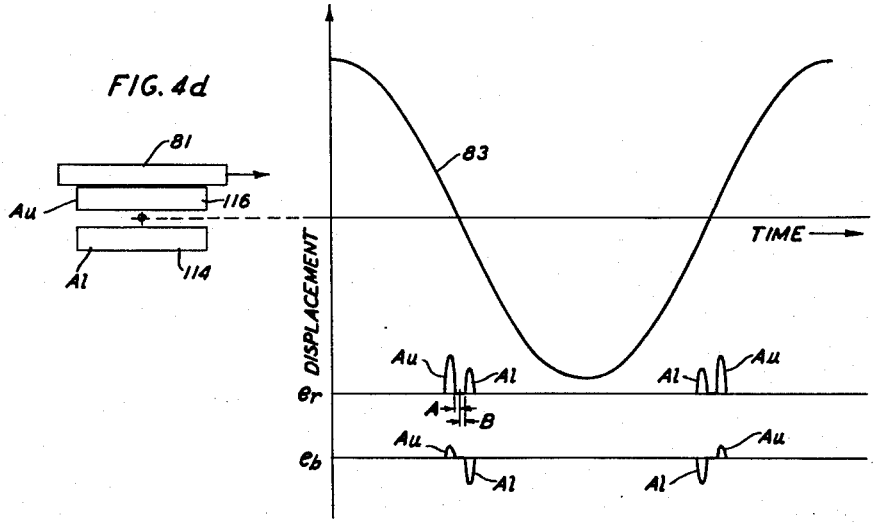

United States Patent Office 3,038,369
Patented June 12, 1962

3,038,369
POSITIONING A TRANSISTOR BY USE OF THE OPTICAL REFLECTANCE CHARACTERISTICS OF THE ELECTRODE STRIPES
Thomas E. Davis, Metuchen, N.J., assignor to Bell Telephone Laboratories, Incorporated, New York, N.Y., a corporation of New York
Filed Dec. 22, 1958, Ser. No. 782,215
5 Claims. (Cl. 88—14)

This invention relates to apparatus for positioning objects with surface areas of differing reflective characteristics. More particularly, it relates to a method and apparatus employing energy of more than one frequency for sensing, producing a signal characteristic of the entire surface for each frequency, and comparing the phases of the characteristic signals to obtain an indication of the position of the object from which the energy is reflected.

Accordingly, a principal object of the invention is to effect the positioning of an object by means requiring no direct mechanical or electrical contact.

A further object of the invention is apparatus for positioning objects, more particularly apparatus using multiple frequency wave forms and utilizing detectible differences in the phases of the reflected component signals.

A further object of the invention is to reduce the time required for the preparation of semiconductive translating devices.

In the manufacture of minute devices, such as diffused junction transistors, of the type disclosed in Patent No. 2,861,018, issued November 18, 1958, to C. S. Fuller and M. Tannenbaum, a major problem is that of positioning leads to the base and emitter electrode stripes for attachment thereto. These areas are so small that microscopes are frequently employed for this positioning process. Obviously, this hand operation is costly and time consuming and therefore not a desirable step in a manufacturing process.

The preferred embodiment of the present invention employs white light to position a diffused junction transistor. By passing light reflected from the surface of the transistor which contains the electrode stripes through a slit in a mask vibrating in a plane perpendicular to the path of the reflected light an oscillating beam is produced. This beam is split into two components, filtered and amplified to produce two electronic signals characteristic of the surface. If these two signals are not in phase a rotation or angular correction designated the $\theta$ direction is indicated. When the two signals are in phase the two metallic stripes are perpendicular to the center of oscillation.

If these two signals are not in phase with the signal representing the motion of the slit, designated "slit signal," a correction parallel to the stripes designated the Y direction is indicated. When the three signals are in phase, the line through the center of vibration of the slit is rotated 90 degrees. If the three signals are not in phase this time, a correction perpendicular to the stripes designated the X direction is indicated. Thus the center of the two stripe complex is determined. This is discussed more fully in connection with FIGURES 4a, 4b, 4c and 4d.

The center of a particular stripe may be found by measuring over a predetermined distance or by vibrating the slit over a particular stripe using an amplitude one and one-half times the width of the stripe as depicted in FIG. 5. If the light component more responsive to this particular stripe is employed, the center will be indicated by a second harmonic.

It is at once apparent to those skilled in the art that the generic principles of the invention are of extremely broad scope. For example, radio waves of two differing frequencies appropriately chosen, according to the reflective characteristics of the object to be examined, may be focused by a suitable system such that the size of the stripe in the vibrating mask is commensurate with the size of the examined object. By monitoring the characteristic signal of the frequency more responsive to the reflecting surface, the signal indicating the centered position will have a frequency twice that of the fundamental characteristic signal and will practically replace the fundamental signal. Both the width of the slit and the amplitude of vibration are determined by the object to be scanned.

The arrangements of the invention may be adapted readily for numerous and varied inspection and control purposes in the fabrication of minute and sensitive elements. By way of specific example, relating particularly to the present invention, the size, shape and position of the electrode stripes on diffused junction transistors affect the signal produced and can be used in a rejection system. For the illustrative system chosen in the present application to exemplify the principles of the invention, blue and red light reflections were employed to produce signals of comparable phase which were characteristic of the examined surface.

It will be understood that for other applications other colors of light or other types of energy such as radio waves, sonic or ultrasonic waves, heat waves or the like may be found more appropriate.

Other objects, features, and advantages of the invention will become apparent during the course of the following detailed description of an illustrative system embodying in one form the principles of the invention and from the appended claims.

In the accompanying drawings:

FIG. 1 illustrates in diagrammatic form one system embodying the principles of the present invention;

FIG. 2 illustrates one means of vibrating the mask employed in the system of FIG. 1;

FIG. 3 illustrates the diffused base transistor with which the system of FIG. 1 is employed to facilitate obtaining accurate positional information for attachment of conductive leads;

FIGS. 4a, 4b, 4c and 4d, are graphs illustrating typical responses received from the transistor surface by the method of FIG. 1; and FIG. 5 is a graph illustrating the response received by the system of FIG. 1 when the transistor is centered on one stripe.

In more detail, in FIG. 1, the specific illustrative system comprises the following components associated as described in detail below.

A white light 1 including strong red and blue components is used as a source. Separate sources of red and blue light could be employed but a single source of white light is more convenient. Source 1 can, for example, be a small tungsten filament lamp, its filament being heated to brilliant incandescence.

The beam of substantially white light 2 is directed to impinge on the surface of specimen 3 as shown.

The reflected light 4 from specimen 3 of the incident beam 2 proceeds through an aperture 52 in the rotatable round supporting table 44 and through the collimating slit in mask 5 which is vibrated by mechanism 45 described in more detail below in connection with FIG. 2. The slit has approximately the dimensions one mil by twenty mils.

The portion of beam 4 which passes through the collimating slit in the vibrating mask 5, impinges on a dichroic mirror 6. Mirror 6 can comprise, for example, a glass plate having deposited by evaporation on one side alternate layers of transparent film of different indices and such thickness that a major portion of red light is transmitted and little reflected and a major amount of blue light is reflected and little transmitted. Such devices are well understood and widely used by those skilled in the art.

The red component 7 of oscillating beam 8 passes directly through mirror 6 and into photomultiplier tube 14 and the blue component 10 is reflected horizontally to the right by mirror 6 and into photomultiplier tube 13 as shown. A red filter 9 is placed in the path of the red component 7 to eliminate other colors or frequencies of light which passed through mirror 6. Likewise a blue filter 11 is positioned in the path of the blue component 10 as shown.

An enclosure 12 which is light tight except for the aperture for member 5 is provided to minimize the possibility of light from any other source reaching the photomultiplier tubes 13 and 14.

The high voltage power supply 15 supplies the photomultiplier tube 14 via lead 16 and photomultiplier tube 13 via lead 17. The output of both photomultiplier tubes 13 and 14 is conducted by leads 18 and 19 respectively to switching device 20 which connects sequentially to the terminals representing the $\theta$, Y and X directions in response to the NO signal device or null indicator 21, as will be described more fully in connection with FIGS. 4a, 4b, 4c and 4d below.

When the switching device 20 is in position $\theta$ the output of photomultiplier tubes 13 and 14 is conducted via leads 18 and 19 respectively to phase comparator 22. The output of phase comparator 22 is connected via lead 23 to the null indicator 21 and to switching device 25 via lead 24. As long as phase comparator 22 is producing a signal both switches 20 and 25 will remain in the $\theta$ position and the output of phase comparator 22 will activate servomechanism 28 which will rotate specimen 3.

When phase comparator 22 no longer produces a signal null indicator 21 is activated. Switching devices 20 and 25 receive the signal produced by the null indicator 21 via leads 26 and 24 respectively and switch to the Y position.

The output of photomultiplier tubes 13 and 14 is conducted via leads 18 and 19 respectively through switching device 20 which is now in the Y position to phase comparator 30. As long as phase comparator 30 is producing a signal, both switches 20 and 25 will remain in the Y position and the output of phase comparator 30 will activate servo micrometer 31 to adjust the work piece in the Y direction.

When phase comparator 30 no longer produces a signal, the null indicator 21 will respond by sending a signal via leads 26 and 33 to switching devices 20 and 25 respectively. The switching devices 20 and 25 are then set in the X position.

In order for an adjustment in position to be made in the X direction the slit must be vibrated in a direction perpendicular to the line through the center of vibration necessary for the $\theta$ and Y adjustments. To accomplish this the null indicator 21 activates stepping switch 41 in unison with the activation of stepping switches 20 and 25. When stepping switch 41 is stepped to the X position a signal is conducted to servo mechanism 43 which rotates the round table 44 ninety degrees. Servo mechanisms or automatic means for rotating round table 44 in a predetermined manner are well known in the art. By way of specific example of one automatic means for rotating the specimen, reference may be had to Patent 2,748,235 to R. L. Wallace, Jr. Since the vibrating mechanism and the mask are secured to this table, the result is to turn the line through the center of vibration of the slit ninety degrees. The X adjustment is exactly the same as the Y adjustment except that micrometer 39 is adjusted instead of micrometer 31.

FIG. 2 illustrates a typical vibrating mechanism used in the apparatus of FIG. 1. Impulses from oscillator 57 are conducted via leads 56 to activate magnet 54 which is fastened to the stationary post 55. Magnet 54 pulls magnet 53. Magnet 53 is attached to mask 5 which is supported by reed springs 51. Reed springs 51 are attached to solid post 50 and so provide the push necessary to return mask 5 to its original position. This push-pull motion vibrates the mask.

In FIG. 3 a typical semiconductor element is illustrated which is conveniently processed by the system of the invention. This element is, of necessity, shown to a greatly enlarged scale but a recitation of its actual dimensions will serve to indicate the problem which the system of FIG. 1 solves. Element 110 may be a piece of germanium, for example, fifty mils square by five mils thick. In this specific embodiment in which the germanium is of P type semiconductive material, a thin layer of N type material is created by "doping" or diffusion in accordance with conventional methods on its upper surface. A raised circular island or mesa 112 is obtained by masking and etching the doped upper surface in accordance with practices well understood in the art, the diameter of the mesa 112 being, for example, eight mils, the upper surface of the mesa 112 being elevated one mil above the remainder of the upper surface of element 110 after etching. The metal electrode stripes or deposits 114 and 116 are formed on the mesa 112 by evaporation of the desired metals through a mask and subsequent alloying by appropriate heating of the assembly, or by a number of other methods well known to those skilled in the art. Stripes 114 and 116 are of aluminum and gold, respectively, each substantially one mil wide. They are parallel to each other, separated by a distance of approximately one mil, and approximately six mils in length.

The response depicted in FIG. 4a is obtained by following the arrow to the right of slit 81. Slit 81 is moved in a direction perpendicular to the arrow. The distance between the arrow and line 82, the center of oscillation, measures the displacement of the slit. A plot against time of the displacement of slit 81 about the line 82 through the center of oscillation produces the slit signal 83. As the slit 81 approaches stripe 114 a voltage will appear as soon as point 84 is reached. The voltage will increase steadily until the slit 81 covers the stripe up to point 85. The voltage will increase further until the width of slit 81 is entirely over stripe 114. The voltage will then remain constant until slit 81 reaches point 86 where it will start to decrease until point 87 is reached whereafter voltage will sharply decrease until slit 81 has entirely passed over stripe 114. At this point the response stops. Naturally, stripe 116 gives a similar response.

A plot of voltage versus time where voltage corresponds to slit displacement when red light is used in the above procedure produces curves 88 and 89. If blue light is used curves 90 and 91 are obtained.

In FIG. 4b because slit 81 reaches points 84 and 85 simultaneously the response received when voltage versus time is plotted for both red and blue light differs slightly from curves 88, 89, 90 and 91 in shape. However, more significantly, the signals from stripe 114 and stripe 116 are in phase because the slit begins and ends its passage over both stripes simultaneously. A phase comparator comparing the phases of the two signals produces null signal and the null indicator of FIG. 1 is activated.

In FIG. 4c stripes 114 and 116 are parallel to each other, perpendicular to the line through the center of oscillation of the slit and equally disposed about this center. As a result the response is altered such that not only are the individual responses from the stripes in phase with each other but both of these are in phase with the slit signal. Again, a phase comparator comparing the phase of the signals from stripe 114 or 116 to the phase of the slit signal will produce a null signal and activate the null indicator of FIG. 1.

In FIG. 4d the slit is turned to oscillate about a line perpendicular to the line through the previous center of oscillation. The signal is obtained exactly in the same manner described above. When the centered position is reached, it is obvious that the signals are equally disposed about the line through the center of oscillation or, as shown in the figure, A=B.

FIG. 5 illustrates the signal received from the surface of a diffused junction transistor by the apparatus of FIG. 1 when the center of a particular stripe is determined. The slit is oscillated above a particular stripe with an amplitude of one and one-half times the width of the stripe. Using the light component more responsive to the particular stripe, the center of the stripe will be indicated by a signal which is, essentially, the second harmonic of the slit signal.

The above-described specific illustrative system is susceptible of numerous and varied modifications and arrangements, all clearly within the spirit and scope of the principles of the present invention, as will at once be apparent to those skilled in the art. No attempt has here been made to exhaustively illustrate all such possibilities.

What is claimed is:

1. Apparatus for positioning an object using the variations in the character of a reflecting surface of said object comprising means for directing radiant energy upon said surface, said energy including at least two components of different frequencies, means for converting reflections of said energy from said surface into a light signal characteristic of the entire surface, means for converting the characteristic light signal into a single electronic signal, means for separating and isolating two components of said electronic signal, electronic means for comparing the phase of these separate component signals, means responsive to said phase difference for automatic adjustment of the position of the surface.

2. Apparatus in accordance with claim 1 wherein said means for converting reflections of said energy into a signal characteristic of the entire surface comprises a mask vibrating in the path of the reflected radiant energy said mask being opaque to the radiant energy and containing a collimating slit to pass a linear element of said reflected radiant energy, and a means to vibrate said mask.

3. Apparatus for interpreting the difference in the reflective characteristics of a surface of a diffused junction transistor having base and emitter stripes thereon to determine the position of the transistor comprising means for directing radiant energy of at least two frequencies upon said surface, means for converting the reflected radiant energy into a signal characteristic of said surface including a mask vibrating in the path of the reflected radiant energy, said mask being opaque to the radiant energy employed and containing a collimating slit to pass a linear element of the reflected radiant energy, a means to vibrate said mask thereby to produce an oscillating beam of radiant energy, means for converting said oscillating beam into two electronic signals including a beam splitter to separate the two components of said reflected radiant energy and a means to amplify the respective components, electronic means for comparing the phases of the two component signals.

4. Apparatus for interpreting the difference in the reflective characteristics of a surface of a diffused junction transistor having base and emitter stripes thereon to determine the position of the transistor comprising means for directing white light upon said surface, means for converting the reflected white light into a signal characteristic of said surface including a mask vibrating in the path of the reflected light, said mask being opaque to white light and containing a collimating slit to pass a linear element of the reflected white light, a means to vibrate said mask thereby to produce an oscillating beam of white light, means for converting said oscillating beam into two electronic signals including a beam splitter to separate the red and blue components of said reflected white light, a red and a blue filter to purify the respective components, a pair of photomultipliers to amplify the respective components, electronic means for comparing the phases of the two component signals.

5. Apparatus for interpreting the difference in the reflective characteristics of a surface of a diffused junction transistor having base and emitter stripes thereon to determine the position of the transistor comprising a white light source directed upon said surface, a mask vibrating in the path of the reflected light, said mask being opaque to white light and containing a collimating slit to pass a linear element of the reflected white light, a vibrating mechanism which oscillates the mask producing an oscillating beam of reflected white light, a dichroic mirror to split the reflected white light into red and blue components, red and blue filters to purify said red and blue components respectively, photomultipliers to conver said red and blue components into electronic signals, and a phase comparator to compare the phases of the electronic signals.

References Cited in the file of this patent

UNITED STATES PATENTS

| | | |
|---|---|---|
| 2,356,567 | Cockrell | Aug. 22, 1944 |
| 2,938,424 | Herriott | May 31, 1960 |